United States Patent [19]

Vezzani

[11] Patent Number: 5,255,446
[45] Date of Patent: Oct. 26, 1993

[54] METHOD FOR ELIMINATING POLLUTANTS AND/OR BAD-SMELLING SUBSTANCES FROM A GASEOUS FLOW PRODUCED BY THE DRYING OF A DAMP SUBSTRATE

[75] Inventor: Corrado Vezzani, Milan, Italy

[73] Assignee: Vomm Impianti E Processi S.r.L., Milan

[21] Appl. No.: 972,634

[22] Filed: Nov. 6, 1992

[30] Foreign Application Priority Data

Nov. 6, 1991 [IT] Italy .................. MI 91 A 002944

[51] Int. Cl.$^5$ .................................................. F26B 21/00
[52] U.S. Cl. ............................................. 34/32; 34/79
[58] Field of Search .............. 34/26, 27, 32, 74, 79; 432/72

[56] References Cited

U.S. PATENT DOCUMENTS

| | | | |
|---|---|---|---|
| 3,601,900 | 8/1971 | Erisman | 34/79 X |
| 3,875,678 | 4/1975 | Vits | 34/79 X |
| 4,926,567 | 5/1990 | Ogawa | 34/79 X |

Primary Examiner—Henry A. Bennet
Attorney, Agent, or Firm—Birch, Stewart, Kolasch & Birch

[57] ABSTRACT

A method for eliminating pollutants and/or bad-smelling substances from a gaseous flow produced by the drying of a damp substrate provides for the separation of suspended solids, dehumidification, the heating and recycling of the gaseous flow to a drying apparatus after extraction of a portion of the flow and subjection of this portion to combustion with the simultaneous destruction of the pollutants and/or bad-smelling substances.

8 Claims, 1 Drawing Sheet

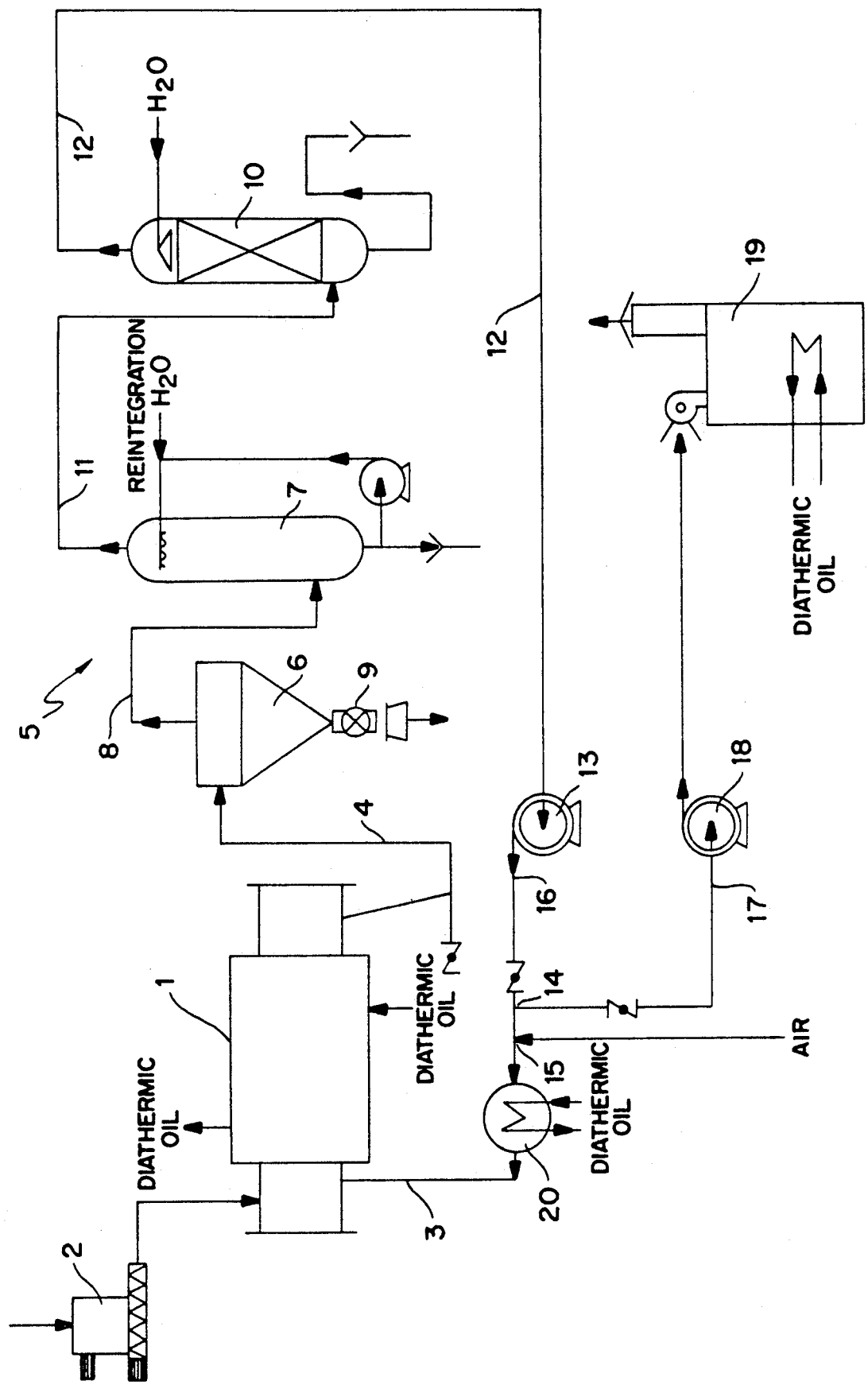

METHOD FOR ELIMINATING POLLUTANTS AND/OR BAD-SMELLING SUBSTANCES FROM A GASEOUS FLOW PRODUCED BY THE DRYING OF A DAMP SUBSTRATE

The present invention relates to a method for eliminating pollutants and/or bad-smelling substances from a gaseous flow produced by the drying of a damp substrate.

In the following description and in the subsequent claims, the words: pollutants and/or bad-smelling substances, are used to mean any chemical compound considered harmful in its effect on the environment and/or on living organisms and substances having a bad smell, respectively.

Such substances include, for example, non-condensable hydrocarbons and aromatic compounds of high molecular weight, such as methane, mercaptans, phosphines, aromatic amines, sulphides, etc.

It is well known that, during drying, many damp substrates, in particular sludges from purification processes, release bad-smelling and/or polluting substances in a gaseous state.

As a rule, these substances are discharged into the atmosphere together with the drying fluid and with the water vapour generated as it is extremely difficult and, in many cases, uneconomical to remove them completely.

The problem is greatly magnified by the fact that these substances, in particular the bad-smelling ones, are not only present in the gaseous flow from drying plants in very low concentrations but, not infrequently, prove impossible to condense at ambient temperature.

This is especially the case with mercaptans, hydrogen sulphide and phosphines.

The consequence is that, until now, the drying of sludges from purification processes has produced a series of environmental problems which have not yet been resolved satisfactorily.

The technical problem underlying the present invention is therefore to provide a method which enables the reliable and economical elimination of pollutants and/or bad-smelling substances from a gaseous flow resulting from the drying of a damp substrate.

This problem is solved, according to the invention, by a method of the type indicated above, characterised in that it includes the stages of:

- subjecting the gaseous flow to a treatment for the separation of suspended solids and to dehumidification;
- recycling the gaseous flow thus obtained to a drying apparatus after extraction of a proportion thereof and subsequent reintegration with an appropriate drying fluid and heating of the reintegrated gaseous flow;
- subjecting the extracted portion of the gaseous flow to combustion with the simultaneous destruction of the pollutants and/or bad-smelling substances.

It is advantageous for the combustion of the extracted portion of the gaseous flow to be carried out in a boiler which produces the heat required for the drying process, which is used, that is, to heat the recycled gaseous flow and/or the drying apparatus.

Further characteristics and advantages of the method according to the invention will become clear from the following embodiments, described purely as non-limitative examples, with reference to a drying plant which is illustrated schematically in the appended drawing.

BRIEF DESCRIPTION OF DRAWING

The appended drawing illustrates a drying plant of the subject invention.

DETAILED DESCRIPTION

The said plant includes a drying apparatus 1, into which are fed a damp substrate to be dried and a hot gaseous drying flow through a screw feeder 2 and a duct 3 respectively.

For the purpose of the invention, the apparatus 1 is preferably of the so-called combined heat-exchange type in which the substrate is dried both by convection, by the gaseous drying flow, and by conduction, by contact with the hot walls of the dryer.

Of these dryers, preference goes to the type known in the industry as turbodryers, which include a bladed rotor which rotates at high speed in a casing heated, for example, by a diathermic oil circulating in an outer jacket.

The drying apparatus 1 is connected by a duct 4 to a section 5 for separating suspended solids including at least one apparatus chosen from the group which includes cyclones, sleeve filters and scrubbers, for example a cyclone 6 and a scrubber 7 connected in series by a duct 8.

The cyclone 6 is provided with a fluid seal assembly 9, for example a star valve for the extraction of the dried substrate.

Downstream of the section 5 for separating suspended solids, a duct 11 connects this section 5 to a filled column for condensing the moisture present in the gaseous flow with an appropriate liquid, preferably water.

The column 10 is connected in turn by a duct 12 to a fan 13 which recycles the gaseous flow to the drying apparatus 1.

Downstream of the fan 13, along a duct 16, are placed in succession an extraction section 14 and a reintegration section 15 for extracting a proportion of the recycled gaseous flow and for making up the extracted proportion of the flow with outside air respectively.

The extraction section 14 is in fluid communication, through a duct 17 and a fan 18, with a boiler 19 for the combustion of non-condensable pollutants or bad-smelling substances present in the extracted gaseous flow.

Finally, downstream of the reintegration section 15 a heat exchanger 20 is provided for heating the gaseous flow recycled to the drying apparatus which is in communication with the heat exchanger 20 through the duct 3.

With the drying plant described above, the method according to the present invention is carried out as follows.

The substrate to be dried, for example sludge from purification processes, is fed into the drying apparatus 1 which reduces its moisture content to the desired level.

The dried substrate leaving the drying apparatus 1 is fed through the duct 4 to the cyclone 6 which achieves substantially complete separation of suspended solids from the gaseous flow.

The removal of the solids is completed in the scrubber 7 so that, on exit from the separating section 5, there will be a gaseous flow substantially devoid of suspended solids, a dried substrate with a required moisture content and a small amount of sludge resulting from the wet precipitation in the scrubber 7 of residual suspended solids left by the cyclone 6.

The gaseous flow thus obtained is then fed, through the duct 11, to the filled column 10 in which it is substantially completely dehumidified. An additional advantage is that the gaseous flow leaving the filled column 10 is devoid of all pollutants which are at all soluble in water.

The gaseous flow thus obtained is then recycled by the fan 13 to the drying apparatus 1 after a proportion has been extracted therefrom and the flow has subsequently been made up with an equivalent quantity of air, drawn from the outside, and heated to the operating temperature of the heat exchanger 20.

The extracted portion of the gaseous flow is fed, through the duct 17 and by means of the fan 18, to the boiler 19 in which non-condensable pollutants and/or bad-smelling substances are eliminated by combustion.

If the drying fluid is air, as it often is, the extracted portion of the gaseous flow is mixed with the combustion air fed to the boiler 19.

This has the advantage that the heat-producing capacity of the pollutants and/or bad-smelling substances is put to use.

If the drying fluid is an inert gas, for example nitrogen, the extracted gaseous flow is fed into the boiler 19 downstream of the burner so that pollutants and/or bad-smelling substances are destroyed by pyrolysis.

It is advantageous for the gaseous flow in the heat exchanger 20 and the drying apparatus 1 to be heated with diathermic oil circulating in a suitable circuit, not illustrated in the drawing, extending between the boiler 19, the heat exchanger 20 and the drying apparatus 1.

With reference to the plant illustrated schematically in the appended drawing, a few examples of the method of the invention are described below.

EXAMPLE 1

A conventional VOMM turbodryer with the following characteristics:
 diameter 900 mm
 length 6000 mm
was supplied with 1800 kg/h of sludge with a 40% solids content resulting from the purification of general municipal and waste effluent.

4000 Nm$^3$/h of air at a temperature of around 250° C. coming from the heat exchanger 20 was supplied in equicurrent with the sludge.

The temperature inside the turbodryer 1 was maintained at around 280° C. after the casing had been heated with a diathermic fluid kept at 300° C. The output from the turbodryer was a 5100 Nm$^3$/h gaseous flow which was sent to a cyclone 6. Here suspended solid particles were separated, giving 900 kg/h of dried solids with a 20% moisture content and 5100 Nm$^3$/h of a gaseous flow with a humidity of 21% by volume.

The gaseous flow thus obtained was sent to the scrubber 7 which eliminated residual solid particles, giving 10 kg/h of sludge with a 15% dry content.

The gaseous flow was then subjected to a dehumidifying treatment after being sent to the filled column 10. Water was used as the condensing liquid at a rate of 20 m$^3$/h. From the gaseous flow exiting the column 10, at a rate of 4000 Nm$^3$/h, a proportion equal to 290 Nm$^3$/h was extracted in the extraction section 14 and sent by the fan 18 to the boiler 19 for combustion of the on-condensable pollutants and/or bad-smelling substances.

Downstream of the extraction section 14, the gaseous flow was made up with an identical quantity of air in the reintegration section 15 and sent to the heat exchanger 20 which heated it to the operating temperature (250° C.).

Under steady conditions, the plant achieved an exchange equal to 10 times the entire recycling gaseous flow per hour.

EXAMPLE 2

1200 kg/h of mycelia from fermentation processes was fed to the turbodryer used in Example 1 along with 3500 Nm$^3$/h of drying air at a temperature of 240° C.

The output from the turbodryer 1 was a gaseous flow of 4660 Nm$^3$/h with a humidity of a 24% by volume.

This gaseous flow was sent to the separation section 5 to separate the suspended solids which gave a gaseous flow of 4660 Nm$^3$/h, 270 kg/h of dried mycelia with a 10% moisture content and 10 kg/h of sludge.

The gaseous flow was then dehumidified in the filled column 10 by the same procedure as described in Example 1.

A proportion equal to 180 Nm$^3$/h, including various non-condensable bad-smelling substances, was extracted from the gaseous flow leaving the column 10 and sent to the boiler 19 for the combustion of these substances.

The flow was made up with the same amount downstream of the extraction section 14 so that a flow of 3500 Nm$^3$h was supplied to the heat exchanger 20 which heated it to the operating temperature of around 240° C.

This method achieved an exchange equal to 6 times the gaseous flow recycling in the plant per hour.

The numerous advantages of the present invention will be immediately apparent from the above description.

Thanks to the use of a combined (convection and conduction) turbodryer it is possible to limit the proportion of the gaseous flow recycled through the plant, with the advantage of reducing the dimensions of the various installations. A consequence of the low flow extraction rates is that the recycled gaseous flow is exchanged completely in a relatively short time, thereby keeping the concentration of pollutants and/or bad-smelling substances very low.

By modifying the extracted and reintegrated portions of the flow, it is also possible to keep the plant slightly below ambient pressure thereby avoiding gas leaks and hence the release of pollutants and/or bad-smelling substances to the atmosphere.

The possibility of using these substances as fuel also has the advantage increasing the overall fuel efficiency of the drying process.

There is an additional recovery of energy in the filled column 10 where all the latent heat of condensation is recovered from the vapour present in the hot gaseous flow leaving the separation section 5 for separating the suspended solids.

If the latter flow contains any condensable solvents, these can, to advantage, be recovered after being separated from the condensed water for example by conventional methods such as distillation or liquid/liquid extraction.

It remains to be added that an expert in the field could make numerous modifications and variations to the plant illustrated schematically here without thereby departing from the protective scope of the present invention as defined in the following claims.

For example, in one variation, the gaseous flow recycled to the drying apparatus 1 could be heated by the heat exchanger 20 and a conventional burner arranged in series with the latter.

In this way the temperature of the recycled gaseous flow is raised even higher, with the advantage that the evaporation capacity of the system is increased.

I claim:

1. (Amended) A method for eliminating pollutants and/or bad-smelling substances from a gaseous flow produced by the drying of a damp substrate, which comprises the following stages:

subjecting the said gaseous flow to a treatment for the separation of suspended solids and to dehumidification;

recycling the gaseous flow thus obtained to a drying apparatus, after extraction of a portion thereof and subsequent reintegration with an appropriate drying fluid, and heating of the reintegrated gaseous flow; and subjecting the extracted portion of the gaseous flow to combustion with the simultaneous destruction of the pollutants and/or bad-smelling substances.

2. A method according to claim 1, wherein the combustion stage is carried out in a boiler provided to heat the recycled gaseous flow and/or in the drying apparatus.

3. A method according to claim 1, wherein the separation of suspended solids is carried out in at least one apparatus selected from cyclones, sleeve filters, and scrubbers.

4. A method according to claim 1, wherein the dehumidification of the gaseous flow is effected by condensation.

5. A method according to claim 4, wherein the condensation is carried out in a filled column.

6. A method according to claim 1, wherein the heating of the reintegrated gaseous flow is effected by a heat exchanger and a burner arranged in series upstream of the drying apparatus.

7. A method according to claim 1, wherein said reintegration with an appropriate drying fluid comprises adding air to the gaseous flow in an amount equivalent to the extracted portion of the gaseous flow.

8. A method according to claim 1, wherein the pollutants and/or bad-smelling substances contained in said gaseous flow are selected from the group consisting of mercaptans, hydrogen sulphide, and phosphines.

* * * * *